(12) United States Patent
Beck (10) Patent No.: US 9,383,051 B1
(45) Date of Patent: Jul. 5, 2016

(54) SHROUDED DYNAMICALLY SEALED ROTARY COUPLING

(75) Inventor: Carl William Beck, Haysville, KS (US)

(73) Assignee: The Boeing Company, Chicago, IL (US)

( * ) Notice: Subject to any disclaimer, the term of this patent is extended or adjusted under 35 U.S.C. 154(b) by 712 days.

(21) Appl. No.: 13/473,977

(22) Filed: May 17, 2012

(51) Int. Cl.
*F16L 27/00* (2006.01)
*F16L 27/08* (2006.01)

(52) U.S. Cl.
CPC .................................. *F16L 27/0828* (2013.01)

(58) Field of Classification Search
CPC ................................................... F16L 27/0828
USPC .............. 285/121.5, 98, 121.1–121.4, 121.6, 285/121.7, 127.1, 127.2, 148.4, 285/153.1–153.3, 272–282; 384/544, 589; 301/105.1; 137/580, 355.16, 355.19, 137/355.26
See application file for complete search history.

(56) References Cited

U.S. PATENT DOCUMENTS

| | | | |
|---|---|---|---|
| 3,462,176 A * | 8/1969 | Goodrum | ................... 285/121.5 |
| 4,108,294 A | 8/1978 | Stewart et al. | |
| 4,249,459 A | 2/1981 | Pruden | |
| 4,302,033 A | 11/1981 | Evans et al. | |
| 4,342,257 A | 8/1982 | Weyer | |
| 4,396,212 A | 8/1983 | Honke | |
| 4,449,738 A | 5/1984 | Hotger | |
| 4,458,798 A | 7/1984 | Bopp | |
| 4,462,619 A | 7/1984 | Hotger | |
| 4,478,247 A | 10/1984 | Alber | |
| 4,591,037 A | 5/1986 | Bopp | |
| 4,848,400 A | 7/1989 | Grant et al. | |
| 4,922,571 A * | 5/1990 | Driear | ..................... E03F 7/106 134/168 C |
| 5,065,792 A | 11/1991 | Ohta et al. | |
| 5,080,401 A | 1/1992 | Stich | |
| 5,174,614 A | 12/1992 | Kaleniecki | |
| 5,267,504 A | 12/1993 | Weyer | |
| 5,691,586 A | 11/1997 | Yonnet et al. | |
| 5,716,080 A | 2/1998 | Kaleniecki | |
| 6,135,138 A | 10/2000 | Richards, Jr. | |
| 6,901,955 B2 | 6/2005 | Valentian | |
| 6,962,321 B1 | 11/2005 | Savage et al. | |
| 7,399,001 B2 | 7/2008 | Maier | |
| 7,942,452 B2 | 5/2011 | Carns et al. | |
| 7,988,201 B2 | 8/2011 | Randle | |
| 2002/0000251 A1 * | 1/2002 | Suzuki | ..................... F16L 39/04 137/580 |
| 2005/0073146 A1 * | 4/2005 | Daehne | ................ A01K 63/006 285/272 |

* cited by examiner

*Primary Examiner* — Daniel P Stodola
*Assistant Examiner* — Jay R Ripley
(74) *Attorney, Agent, or Firm* — Baldauff IP, LLC; Michael J. Baldauff, Jr.

(57) ABSTRACT

The present disclosure is directed to a sealed rotary fluid coupling apparatus including a first housing having an inner diameter there-through, a first internal seal interface, a second internal seal interface and a bleed port extending from the inner diameter to an outer surface of the first housing. A second housing includes an inner diameter there-through, a first internal seal interface external to the inner diameter and a second internal seal interface external to the inner diameter. The first housing and the second housing are configured to engage each other such that at least a portion of the second housing inner diameter is disposed within the first housing inner diameter. The sealed rotary fluid coupling apparatus further includes a first and second seals operable to create seals between the first housing first internal seal interface and the second housing first internal seal interface.

13 Claims, 9 Drawing Sheets

SHROUDED DYNAMICALLY SEALED ROTARY COUPLING

TECHNICAL FIELD

The field of the embodiments presented herein lie within rotary couplings used for fluid transfer having redundant seals.

BACKGROUND

Rotary fluid couplings enable liquid to be transferred between two relatively rotating parts, such as a stationary supply pipe for a fuel reservoir and a rotating delivery pipe for a refueling hose reel. While many such couplings have been devised in the past, many couplings have no indication of whether a primary seal has failed.

There exists a need for a rotary fluid coupling device to reduce hazardous spillage, leakage and cleanup in applications where a rotary motion of a transfer piping system is required. In particular, there is a need for a mechanical configuration of a rotary coupling that provides primary and secondary seals as well as an indication of failure of the primary seal. It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter In one embodiment disclosed herein, a sealed rotary fluid coupling apparatus includes a first housing having a first housing inner diameter there-through, a first housing first internal seal interface internal to the inner diameter, a first housing second internal seal interface external to the inner diameter and a first housing bleed port extending from the inner diameter to an outer surface of the first housing. The first housing bleed port originates from the inner diameter to a location between the first housing first internal seal interface and the first housing second internal seal interface. The sealed rotary fluid coupling apparatus further includes a second housing having a second housing inner diameter there-through, a second housing first internal seal interface external to the inner diameter and a second housing second internal seal interface external to the inner diameter. The first housing and the second housing are configured to engage each other such that at least a portion of the second housing inner diameter is disposed within the first housing inner diameter. The sealed rotary fluid coupling apparatus further includes a first internal seal operable to create a first seal between the first housing first internal seal interface and the second housing first internal seal interface. The sealed rotary fluid coupling apparatus further includes a second internal seal operable to create a second seal between the first housing second internal seal interface and the second housing second internal seal interface, the second internal seal interface having a diameter greater that the first internal seal interface, where the first housing and the second housing are rotatable with respect to one another.

In another embodiment disclosed herein, a sealed rotary fluid coupling apparatus includes a first housing having a first housing central inner diameter having a first housing inlet and a first housing outlet, a first housing static seal configured to join the sealed rotary fluid coupling apparatus to a fluid delivery device and a first housing pressure energized primary dynamic seal disposed on an interior portion of the first housing central inner diameter. The first housing further includes a first housing bleed port connecting a portion of the first housing central inner diameter between the first housing inlet and the first housing pressure energized primary dynamic seal and a first housing external portion. A first housing pressure energized secondary dynamic seal interface being disposed on a first housing outer diameter opposite the first housing inlet of the first housing central inner diameter. The sealed rotary fluid coupling apparatus includes a second housing having a second housing central inner diameter having a second housing inlet and a second housing outlet, a second housing static seal configured to join the sealed rotary fluid coupling apparatus to a fluid reservoir, and a second housing pressure energized secondary dynamic seal disposed on a second housing exterior portion of the second housing central inner diameter. The second housing further includes a second housing first bleed port connecting a portion of the second housing central inner diameter between the second housing exterior portion of the second housing central inner diameter and a second housing external portion, and a second housing pressure energized primary dynamic seal interface being disposed on a second housing outer diameter opposite the second housing outlet of the second housing central inner diameter. The sealed rotary fluid coupling apparatus further includes a sealed rotatable bearing affixed between the first housing and the second housing. The first housing pressure energized dynamic seal is configured to engage the second housing pressure energized primary dynamic seal interface, and the second housing pressure energized secondary dynamic seal configured to engage the first housing pressure energized secondary dynamic seal interface.

In another embodiment disclosed herein, a method of assembling a rotary sealed fluid coupling apparatus includes affixing a sealed rotatable bearing to an outer diameter of a first housing, affixing a first housing bearing retainer on the outer diameter of the first housing configured to secure the sealed rotatable bearing to the first housing, and inserting a portion of a second housing within an inner diameter of the first housing. The method further includes affixing a primary dynamic seal between the inner diameter of the first housing and an outer diameter of the portion of the second housing, affixing a secondary dynamic seal between the outer diameter of the first housing and a second inner diameter of the second housing, and affixing a second housing bearing retainer on the second inner diameter of the second housing configured to secure the sealed rotatable bearing to the second housing.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein.

DETAILED DESCRIPTION

The following detailed description is directed to a sealed rotary fluid coupling device and method of assembly. The sealed rotary fluid coupling device has the potential for being used by any industry that moves fluids thru a transfer piping system. These would include gasoline and oil production, chemical production, pesticides production and other hazardous, (toxic or flammable), fluid handling systems where containment of leaks and spills is important.

The device solves the problem of how to seal a fluid line where it transitions from a stationary tube into the revolving drum of a hose reel while providing a secondary full pressure capable shroud in case the primary means of sealing the rotary joint fails and providing a means to detect failures of the primary sealing means. In particular, the embodiments presented herein disclose a mechanical configuration of a rotary coupling that provides primary and secondary seals as well as an indication of failure of the primary seal.

Figure 1:
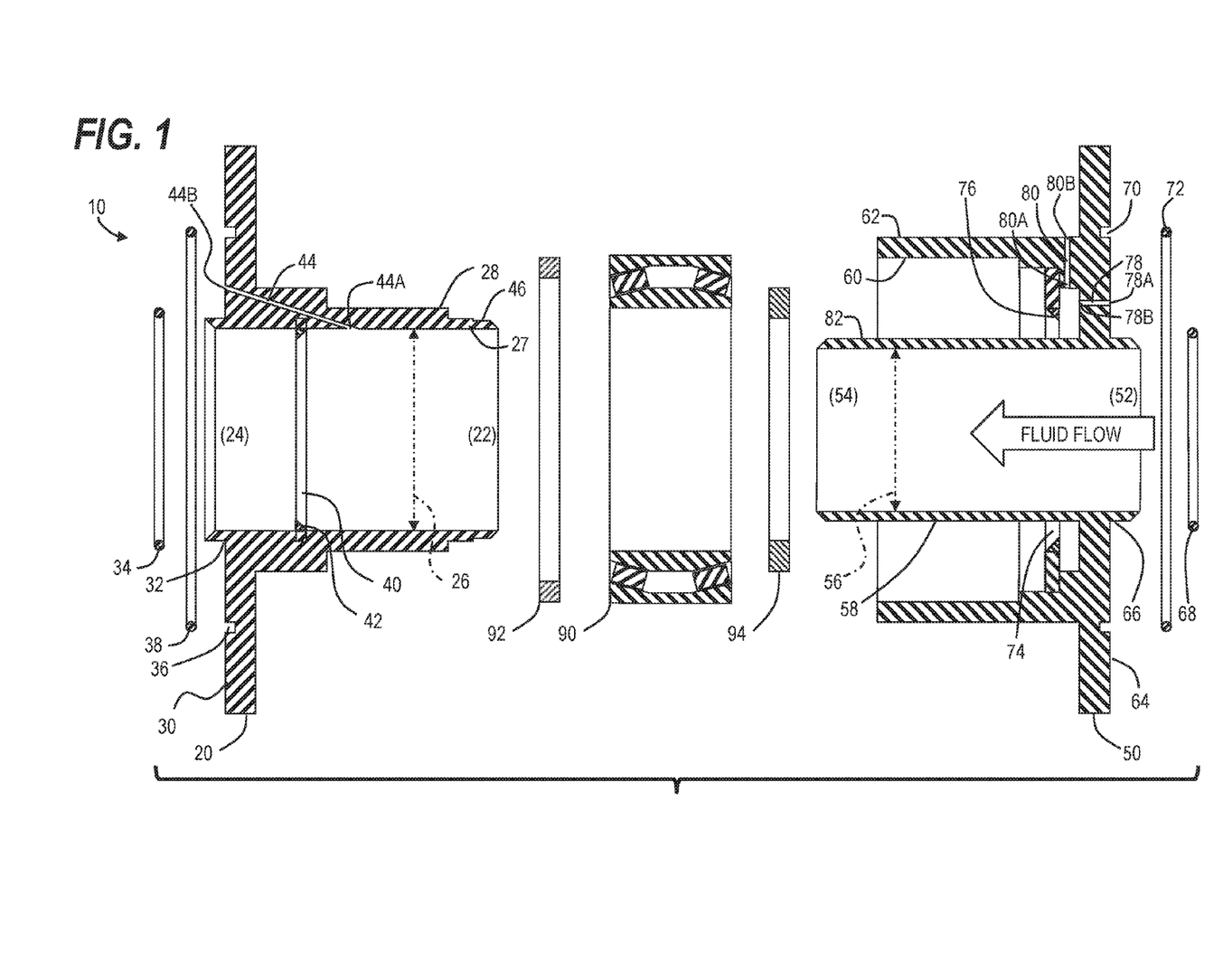
FIG. 1 illustrates a cross-sectional exploded assembly view of one embodiment of a sealed rotary coupling according to at least one embodiment disclosed herein.

FIG. 1 illustrates a cross-sectional exploded assembly view of one embodiment of a sealed rotary coupling 10 that includes a first housing 20 having a first housing inlet 22 at one end, and a first housing outlet 24 disposed at a distal end of a through-bore having a first housing internal surface 27 defined by a first housing inner diameter 26. The first housing 20 further includes a first housing outer diameter 28 having a plurality of discrete diameters based on the function of the embodiments presented herein. A polished first housing secondary dynamic seal contact surface 46 is defined by the first housing outer diameter 28 that receives a secondary dynamic seal, (as described below). The first housing 20 also includes a first housing flange 30 that includes a first housing O-ring shoulder 32 that receives a first housing primary static seal O-ring 34 thereupon, and a first housing O-ring groove 36 that receives a first housing secondary static seal O-ring 38. The first housing flange 30 and the O-rings 34/38 are configured to be connected to a fluid delivery device (not shown) that receives and discharges fluid after passing through the through-bore first housing inner diameter 26.

The first housing 20 additionally includes a first housing primary dynamic seal groove 40 that receives a first housing primary dynamic seal 42. The first housing primary dynamic seal 42 may include a radial shaft seal that protrudes into the through-bore of the first housing inner diameter 26. The first housing 20 further includes a first housing bleed port 44 that has a bleed port inlet 44A between the first housing inlet 22 and the first housing primary dynamic seal groove 40 and first housing primary dynamic seal 42. A bleed port outlet 44B is configured to exit between the first housing O-ring shoulder 32 and the first housing O-ring groove 36 on the first housing flange 30. The sealed rotary coupling 10 further includes a second housing 50 having a second housing inlet 52 and a second housing outlet 54 defined by a second housing first inner diameter 56. The second housing includes a second housing first outer diameter 58 defining a polished second housing primary dynamic seal contact surface 82 that receives the first housing primary dynamic seal 42, (as described below). The second housing 50 further includes a second housing second inner diameter 60 and a second housing second outer diameter 62 used to support a sealed double row bearing 90, (as described below). The sealed double row bearing 90 may be replaced with any member of the larger family of rolling-element bearings, and may include magnetic bearings or plain/journal bearings depending on operational speed and loading requirements. A second housing flange 64 includes a second housing O-ring shoulder 66 to receive a second housing primary static seal O-ring 68, and a second housing O-ring groove 70 receives a second housing secondary static seal O-ring 72. The second housing flange 64 and the O-rings 68/72 are configured to be connected to a fluid reservoir device that stores and discharges fluid to be passed through the through-bore second housing inner diameter 56.

The second housing 50 further includes a second housing first bleed port 78 including a first bleed port inlet 78A disposed between the second housing O-ring shoulder 66 and the second housing O-ring groove 70, and a first bleed port outlet 78B disposed between the second housing first outer diameter 58 and the second housing second inner diameter 60 on an outer portion of the second housing flange 64.

In a similar manner, the second housing 50 includes a second housing second external bleed port 80 including a second external bleed port inlet 80A disposed between the second housing O-ring shoulder 66 and the second housing O-ring groove 70, and a second external bleed port outlet 80B disposed between the second housing flange 64 and the second housing second outer diameter 62.

A sealed double row bearing 90 mounts via an inner diameter to the first housing outer diameter 28 and is secured by a first housing inner diameter threaded jam nut 94. The sealed double row bearing 90 also mounts via an outer diameter to the second housing second inner diameter 60 and is secured by a second housing outer diameter threaded jam nut 92.

Figure 2:
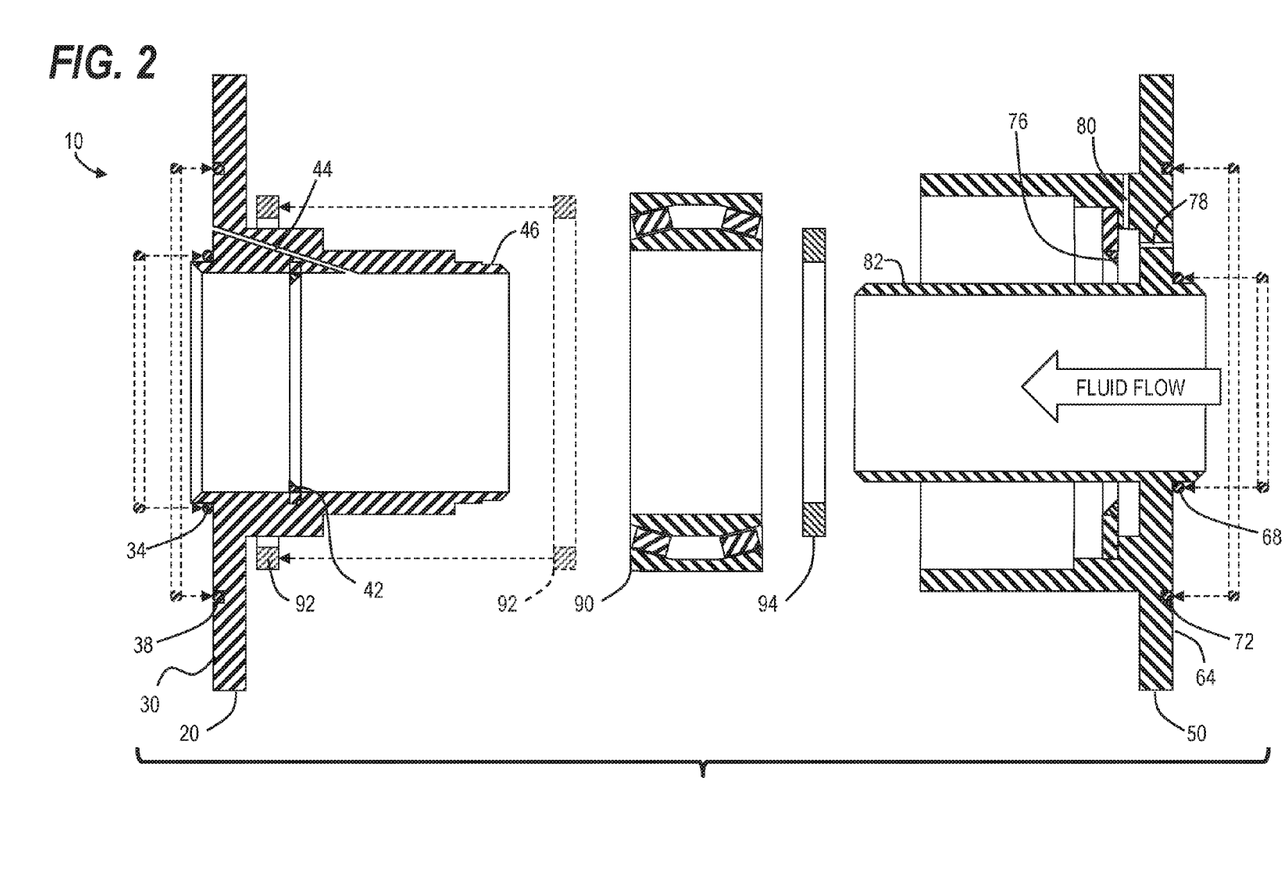
FIG. 2 illustrate a cross-sectional exploded assembly view of one step of a method of assembling a sealed rotary coupling according to at least one embodiment disclosed herein.

FIGS. 1-7 demonstrate a method of assembly of the sealed rotary coupling 10. FIG. 2 illustrates the first housing primary static seal O-ring 34 and the first housing secondary static seal O-ring 38 being received in the a first housing O-ring shoulder 32 and the first housing O-ring groove 36, respectively, on an exterior portion of the first housing flange 30. In similar manner, the second housing primary static seal O-ring 68 and the second housing secondary static seal O-ring 72 are received on the second housing O-ring shoulder 66 and the second housing O-ring groove 70, respectively, on an exterior portion of the second housing flange 64. FIG. 2 further illustrates the second housing outer diameter threaded jam nut 92 being moved over a portion of the first housing outer diameter 28 near the first housing flange 30.

Figure 3:
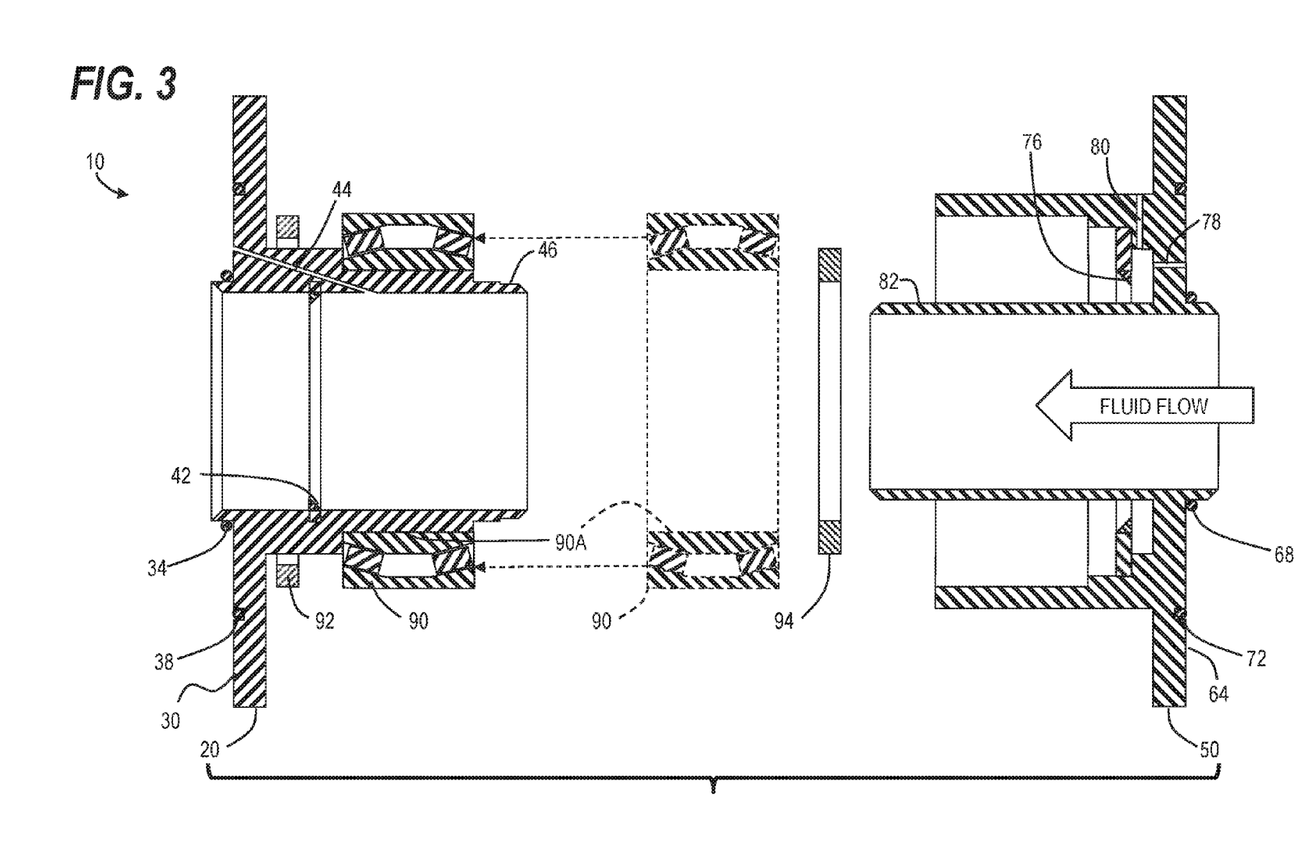
FIG. 3 illustrate a cross-sectional exploded assembly view of another step of a method of assembling a sealed rotary coupling according to at least one embodiment disclosed herein.

FIG. 3 illustrates the sealed double row bearing 90 being secured upon the first housing outer diameter 28 via a bearing inner diameter 90A. The sealed double row bearing 90 includes an inner and an outer race and a plurality of inner bearing elements. In the embodiment presented herein, e.g., the sealed double row bearing 90 includes a tapered bearing where the plurality of bearing elements are at an angle with respect to the main rotational axis of the sealed double row bearing 90.

Figure 4:
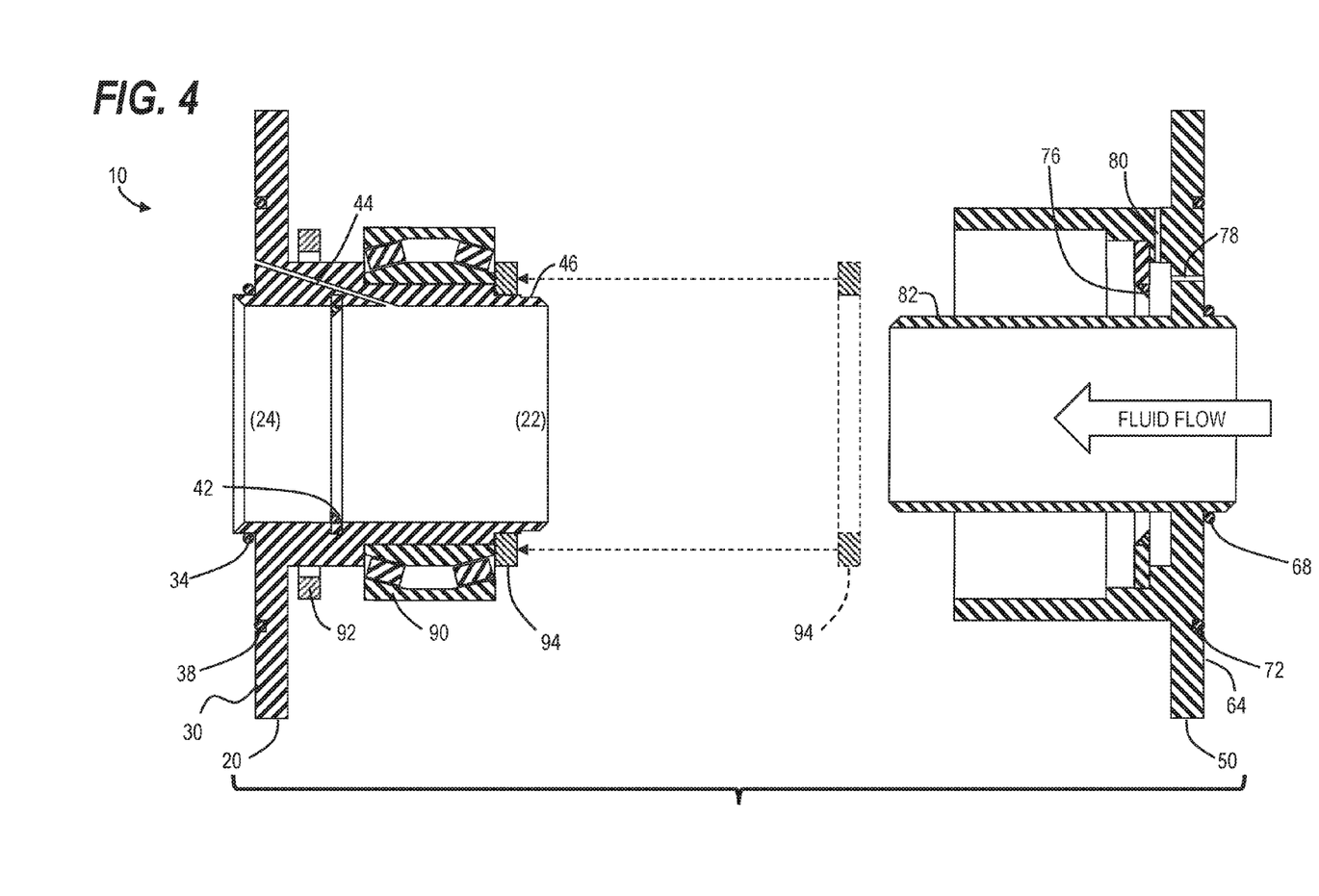
FIG. 4 illustrate a cross-sectional exploded assembly view of another step of a method of assembling a sealed rotary coupling according to at least one embodiment disclosed herein.

FIG. 4 illustrates the first housing inner diameter threaded jam nut 94 being secured to a portion of the first housing outer diameter 28 by laterally providing a compression fit for the sealed double row bearing 90 against first housing 20. In the alternative, first housing inner diameter threaded jam nut 94 need not have threading to engage the first housing 20, but may be attached by a compression fit, welding or any other equivalent attachment method.

Figure 5:
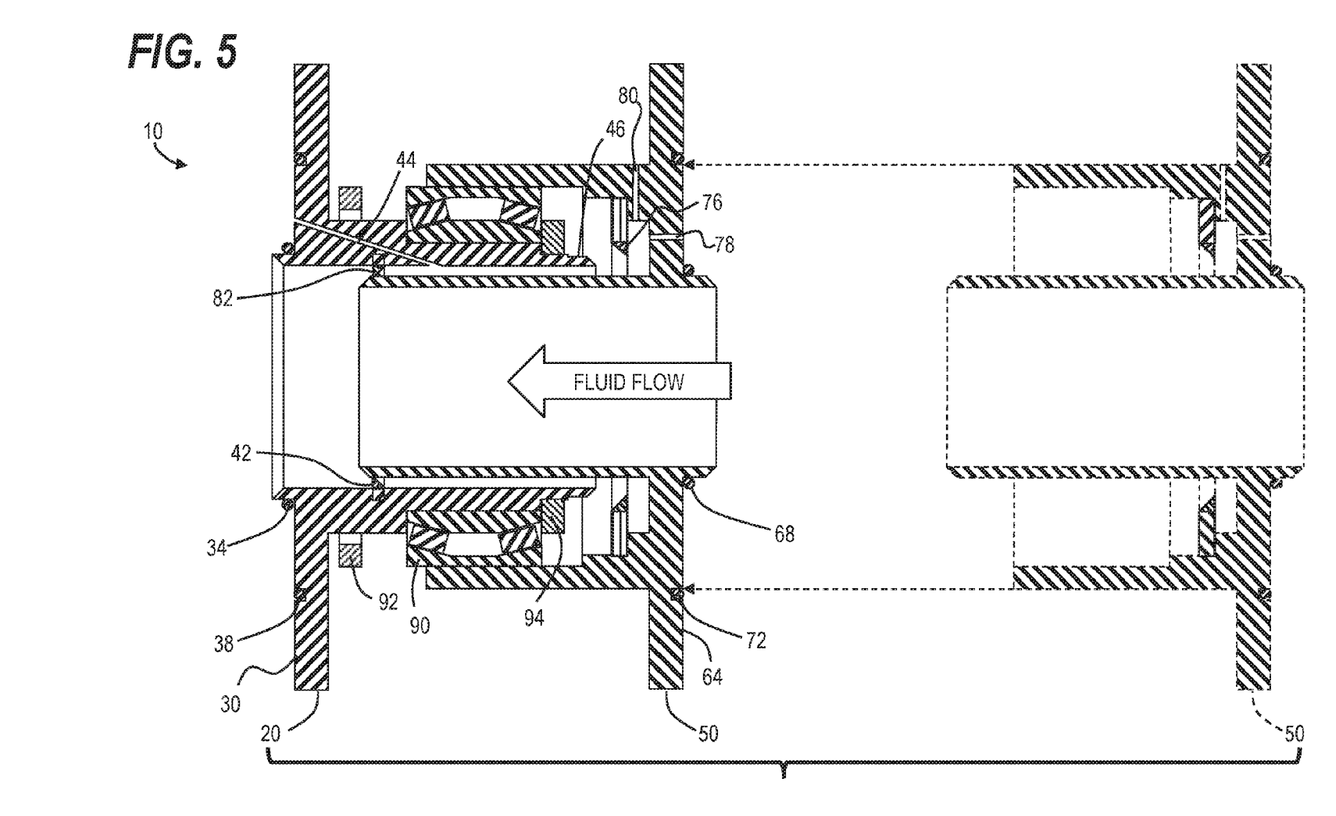
FIG. 5 illustrate a cross-sectional exploded assembly view of another step of a method of assembling a sealed rotary coupling according to at least one embodiment disclosed herein.
Figure 6:
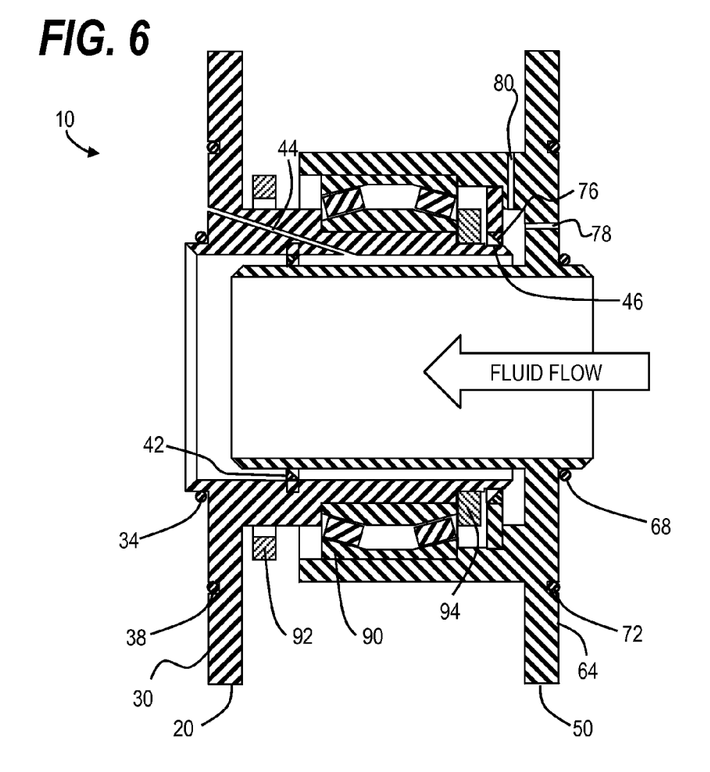
FIG. 6 illustrate a cross-sectional exploded assembly view of another step of a method of assembling a sealed rotary coupling according to at least one embodiment disclosed herein.

FIG. 5 illustrates the second housing 50 moving into an intermediate position such that the second housing first outer diameter 58 engages the first housing primary dynamic seal 42 at the polished second housing primary dynamic seal contact surface 82. FIG. 6 illustrates the second housing 50 moving into a final position such that the polished first housing secondary dynamic seal contact surface 46 engages the second housing secondary dynamic seal 76.

Figure 7:
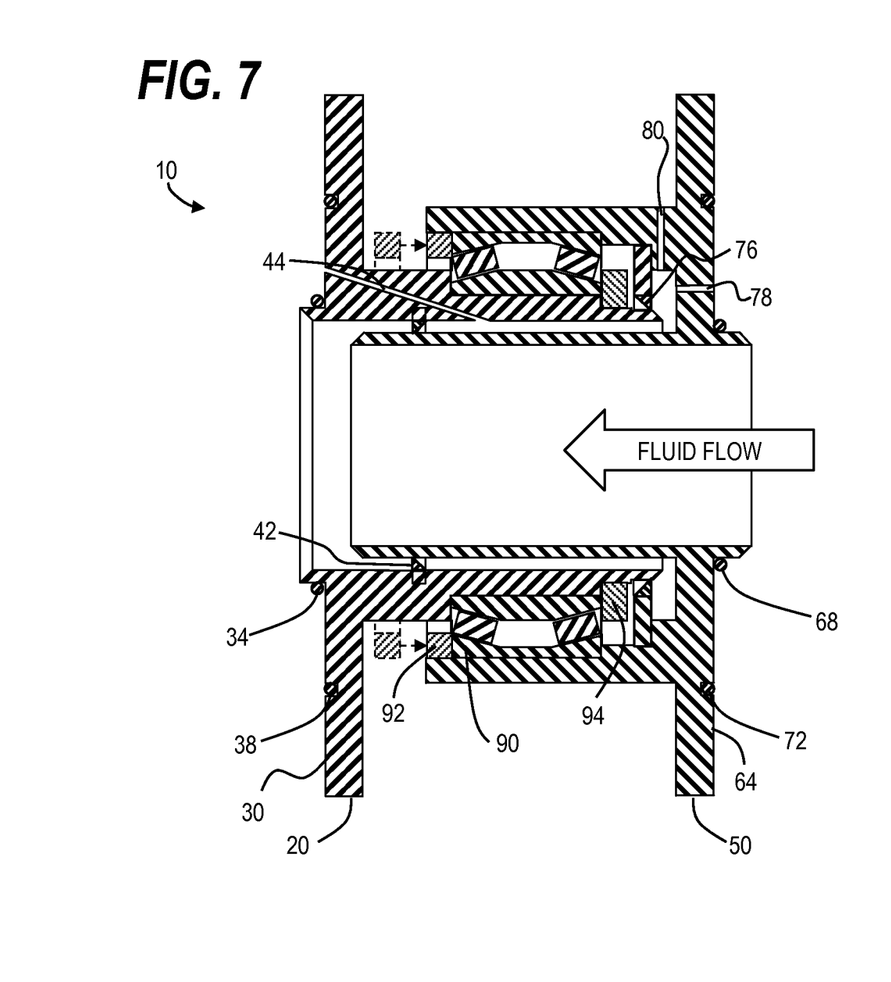
FIG. 7 illustrate a cross-sectional exploded assembly view of a final step of a method of assembling a sealed rotary coupling according to at least one embodiment disclosed herein.

FIG. 7 illustrates the second housing outer diameter threaded jam nut 92 being secured to a portion of the second housing second inner diameter 60 by laterally providing a compression fit for the sealed double row bearing 90 against second housing 50. In the alternative, second housing outer diameter threaded jam nut 92 need not have threading to engage the second housing 50, but may be attached by a compression fit, welding or any other equivalent attachment method. Now the sealed double row bearing 90 may freely rotate allowing the first housing 20 to rotate independently of the second housing 50.

The second housing 50 includes a second housing secondary dynamic seal groove 74 that receives a second housing secondary dynamic seal 76, similar to the first housing primary dynamic seal 42 except mounted in an opposite direction. The second housing secondary dynamic seal 76 may include a radial shaft seal that protrudes into the area between the second housing first outer diameter 58 and the second housing second inner diameter 60.

Figure 8:
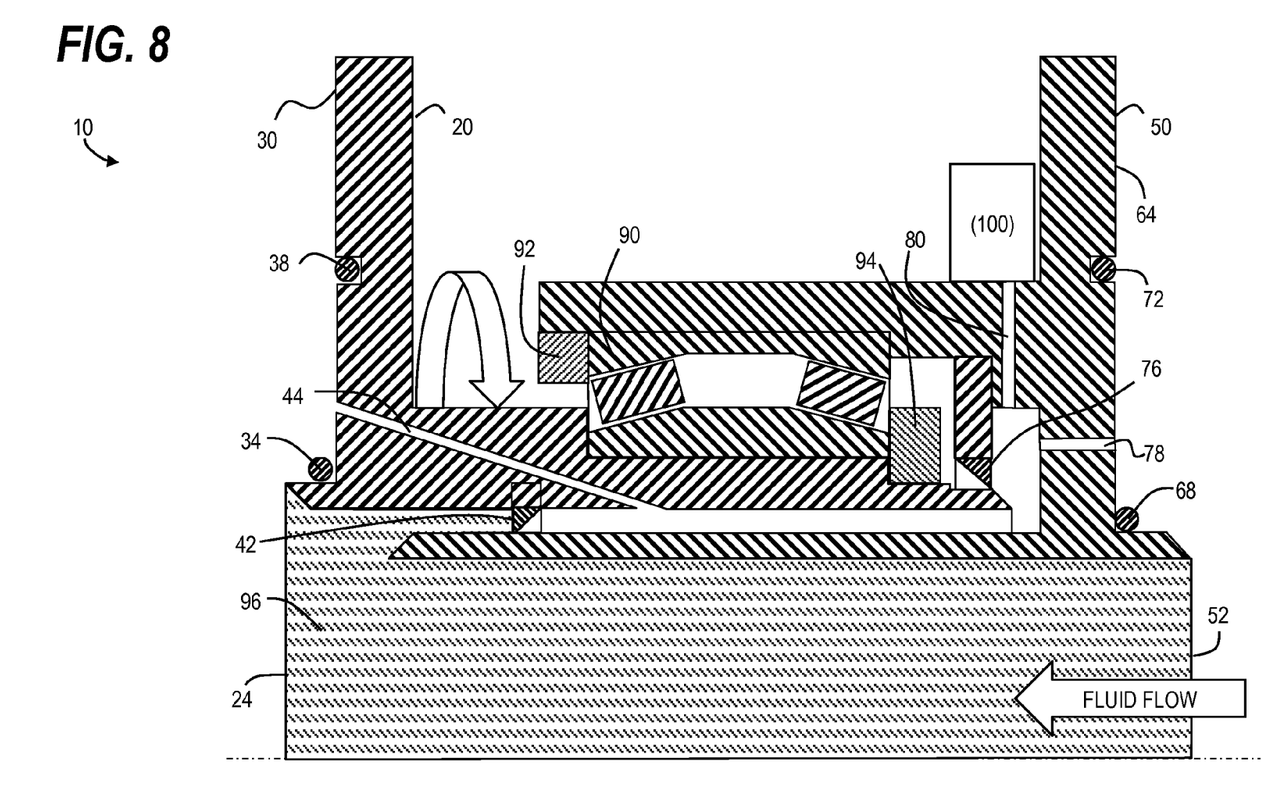
FIG. 8 illustrate a partial cross-sectional assembled view of the sealed rotary coupling according to at least one embodiment disclosed herein.

FIG. 8 illustrates the sealed rotary coupling 10 under operation where a fluid 96 flows from the second housing inlet 52 through to the first housing outlet 24. Fluid is trapped from moving in a direction toward the sealed double row bearing 90 by the first housing primary dynamic seal 42 such that when a fluid pressure is exerted by the fluid 96 on the first housing primary dynamic seal 42, the first housing primary dynamic seal 42 presses with more force against the second housing first outer diameter 58 to create a tighter seal. However, should the first housing primary dynamic seal 42 fail, fluid 96 will travel between the second housing first outer diameter 58 and the first housing inner diameter 26. However, the sealed double row bearing 90 is protected by the second housing secondary dynamic seal 76 that operates in similar manner to the first housing primary dynamic seal 42.

During a failure of the first housing primary dynamic seal 42, fluid 96 will travel through the first housing bleed port 44 between the first housing primary static seal O-ring 34 and the first housing secondary static seal O-ring 38 on the first housing flange 30, the second housing first bleed port 78 between the second housing primary static seal O-ring 68 and the second housing secondary static seal O-ring 72 on the second housing flange 64, and the second housing second external bleed port 80. The second external bleed port outlet 80B may be connected to an indicator device 100 that may constitute a pressure gauge configured to act as an alarm, or an overboard drain port to be connected to drain mast and sample witness tank or indicator to identify when the first housing primary dynamic seal 42 has failed.

Figure 9:
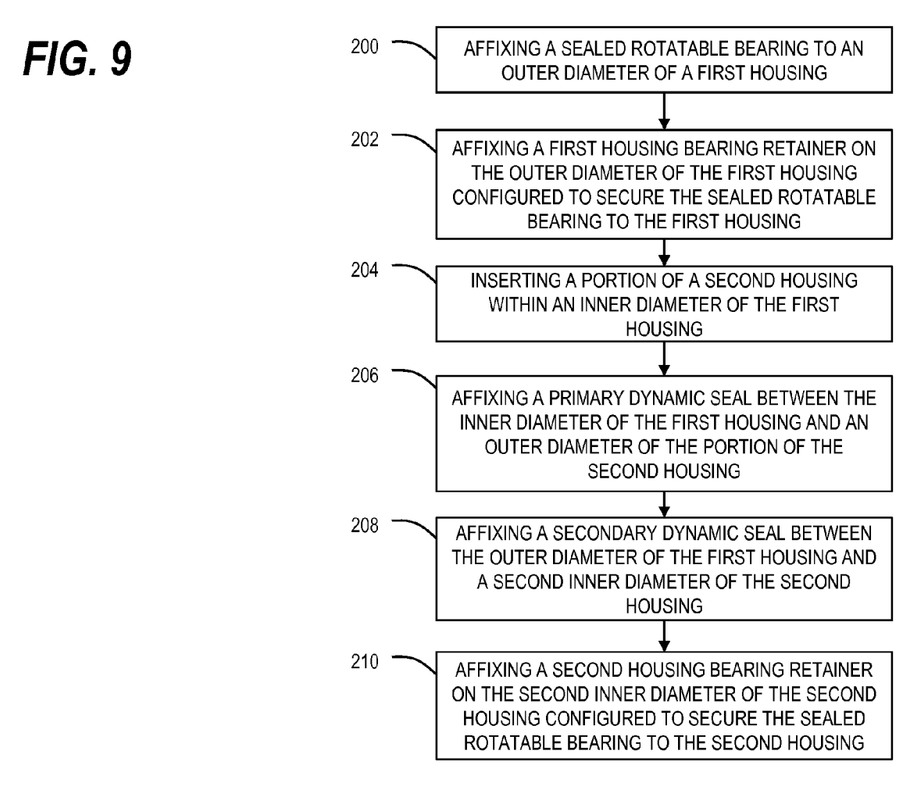
FIG. 9 illustrates a logic flow diagram of a method of assembling the sealed rotary coupling according to at least one embodiment disclosed herein.

FIG. 9 illustrates a logic flow diagram of a method of assembling the sealed rotary coupling that includes affixing 200 a sealed rotatable bearing to an outer diameter of a first housing, affixing 202 a first housing bearing retainer on the outer diameter of the first housing configured to secure the sealed rotatable bearing to the first housing, inserting 204 a portion of a second housing within an inner diameter of the first housing, affixing 206 a primary dynamic seal between the inner diameter of the first housing and an outer diameter of the portion of the second housing, affixing 208 a secondary dynamic seal between the outer diameter of the first housing and a second inner diameter of the second housing, and 210 affixing a second housing bearing retainer on the second inner diameter of the second housing configured to secure the sealed rotatable bearing to the second housing.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

The invention claimed is:

1. A sealed rotary fluid coupling apparatus comprising:
   a first housing comprising:
      a first housing inner diameter defining a first housing internal surface of the first housing,
      a first housing primary dynamic seal groove within the first housing internal surface,
      a first housing secondary dynamic seal contact surface defined by a first housing outer diameter, and
   a first housing jam nut;
   a second housing comprising:
      a second housing first inner diameter and a second housing second inner diameter greater than the second housing first inner diameter,
      a second housing primary dynamic seal contact surface, and
      a second housing secondary dynamic seal groove within a second housing surface defined by the second housing second inner diameter, and
      a second housing jam nut
      a sealed bearing operable disposed between the first housing jam nut and the second housing jam nut, the first housing jam nut and the second housing jam nut and the sealed bearing configured to attach the first housing and the second housing to one another with at least a portion of the second housing disposed within the first housing and providing a compression seal between the first housing and the second housing;
   a first housing primary dynamic seal operable to create a first seal between the first housing primary dynamic seal groove and the second housing primary dynamic seal contact surface; and
   a second housing secondary dynamic seal operable to create a second seal between the first housing secondary dynamic seal contact surface and the second housing secondary dynamic seal groove, the first housing and the second housing rotatable with respect to one another.

2. The sealed rotary fluid coupling apparatus according to claim 1, the first housing further comprises:

a first housing bleed port extending from the first housing internal surface to an outer surface of the first housing, the first housing bleed port originating from the first housing internal surface at a location between the first housing first internal seal primary dynamic seal groove and the first housing secondary dynamic seal contact surface; and a first housing flange including a first housing primary static seal and a first housing secondary static seal, the first housing bleed port extending to a location between the first housing primary static seal and the first housing secondary static seal.

3. The sealed rotary fluid coupling apparatus according to claim 1, the second housing further comprises:

a second housing flange including a second housing primary static seal external to the second housing and a second housing secondary static seal external to the second housing;

a second housing first bleed port extending from a location between the first housing primary dynamic seal and the second housing secondary dynamic seal to a location between the second housing primary static seal and the second housing secondary static seal;

a second housing second bleed port extending from a location between the first housing primary dynamic seal and the second housing secondary dynamic seal to a location external from the second housing; and a pressure sensor fitted on the second housing second bleed port at the location external from the second housing.

4. A sealed rotary fluid coupling apparatus comprising:

a first housing including:

a first housing inlet and a first housing outlet defining a first housing internal surface of a first housing through-bore;

a first housing static seal configured to join the sealed rotary fluid coupling apparatus to a fluid delivery device;

a first housing pressure energized primary dynamic seal disposed on the first housing internal surface of the first housing through-bore;

a first housing bleed port connecting a portion of the first housing through-bore between the first housing inlet and the first housing pressure energized primary dynamic seal and a first housing external portion;

a first housing secondary dynamic seal contact surface defined by a first housing outer diameter proximate to the first housing inlet and external to the first housing internal surface of the first housing through-bore;

a second housing including:

a second housing inlet and a second housing outlet defining a second housing through-bore;

a second housing static seal configured to join the sealed rotary fluid coupling apparatus to a fluid reservoir;

a second housing pressure energized secondary dynamic seal disposed on a second housing exterior portion of the second housing through-bore;

a second housing first bleed port connecting an internal portion of the second housing exterior to the second housing through-bore to a second housing external portion;

a second housing primary dynamic seal contact surface defined by a second housing outer diameter proximate to the second housing outlet; and a sealed rotatable bearing affixed between the first housing and the second housing, the first housing pressure energized dynamic seal configured to engage the second housing primary dynamic seal contact surface, and the second housing pressure energized secondary dynamic seal configured to engage the first housing secondary dynamic seal contact surface.

5. The sealed rotary fluid coupling apparatus according to claim 4, wherein the first housing static seal further comprises:

a first housing primary static seal O-ring; and a first housing secondary static seal O-ring.

6. The sealed rotary fluid coupling apparatus according to claim 4, wherein the second housing static seal further comprises:

a second housing primary static seal O-ring; and a second housing secondary static seal O-ring.

7. The sealed rotary fluid coupling apparatus according to claim 4, wherein the first housing bleed port includes an inlet between the first housing pressure energized primary dynamic seal and the second housing pressure energized secondary dynamic seal, and an outlet proximate the first housing static seal.

8. The sealed rotary fluid coupling apparatus according to claim 4, wherein the second housing first bleed port includes an inlet between the first housing pressure energized primary dynamic seal and the second housing pressure energized secondary dynamic seal, and an outlet proximate the second housing static seal.

9. The sealed rotary fluid coupling apparatus according to claim 4, the second housing through-bore being received within the first housing through-bore.

10. The sealed rotary fluid coupling apparatus according to claim 4, the first housing secondary dynamic seal contact surface of the first housing and the second housing primary dynamic seal contact surface of the second housing being a polished surface that receives the first housing pressure energized primary dynamic seal and the second housing pressure energized secondary dynamic seal, respectively.

11. The sealed rotary fluid coupling apparatus according to claim 4, further comprising:

a first housing jam nut affixed to the first housing outer diameter configured to secure a first end of the sealed rotatable bearing; and a second housing jam nut affixed to a second housing inner diameter configured to secure a second end of the sealed rotatable bearing, the first housing jam nut and the second housing jam nut hold the sealed rotatable bearing in a compression fit.

12. The sealed rotary fluid coupling apparatus according to claim 4, further comprising a second housing second bleed port includes an inlet between the first housing pressure energized primary dynamic seal and the second housing pressure energized secondary dynamic seal, and an outlet to an exterior portion of the second housing.

13. The sealed rotary fluid coupling apparatus according to claim 12, further comprising a pressure sensor fitted on the outlet of the second housing second bleed port.

* * * * *